Feb. 4, 1947.  S. C. HURLEY, JR  2,415,176
PHOTOELECTRIC APPARATUS FOR SCANNING ROUNDS
Filed July 17, 1944  3 Sheets-Sheet 1
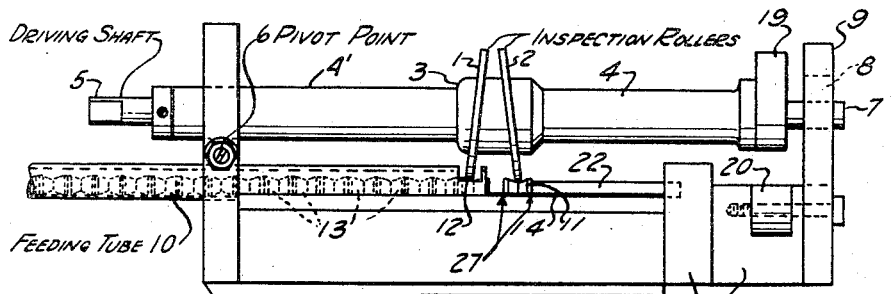
Fig. 1
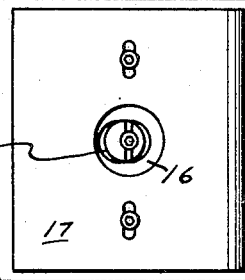
Fig. 2
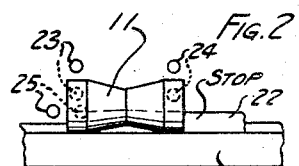
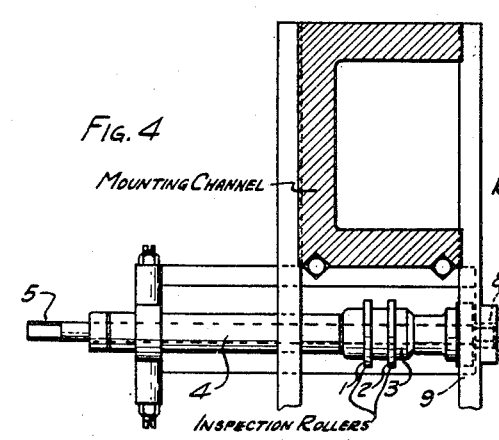
Fig. 4
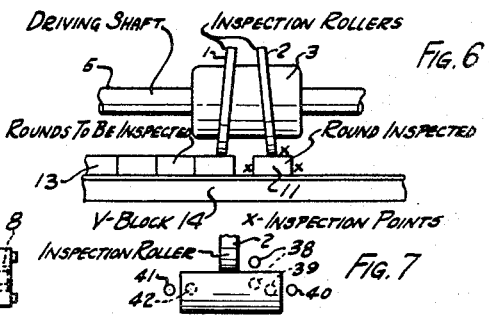
Fig. 6
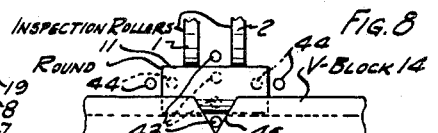
Fig. 7
Measuring Diameter And Photoelectric Camming Length Of Round.
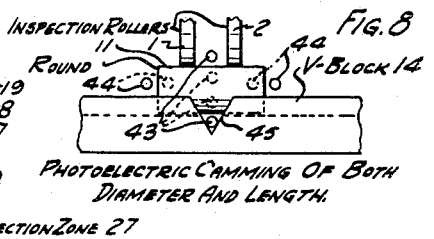
Fig. 8
Photoelectric Camming Of Both Diameter And Length.
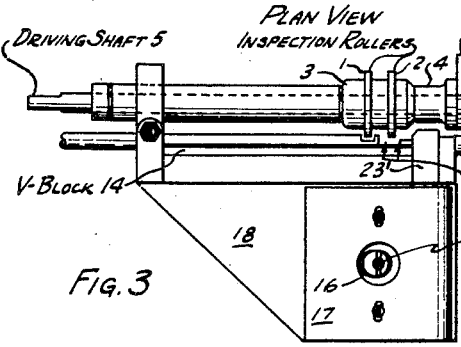
Fig. 3
INVENTOR.
Samuel C. Hurley Jr.
BY Benedict & Suertund
Attorneys Feb. 4, 1947.  S. C. HURLEY, JR  2,415,176
PHOTOELECTRIC APPARATUS FOR SCANNING ROUNDS
Filed July 17, 1944  3 Sheets-Sheet 2
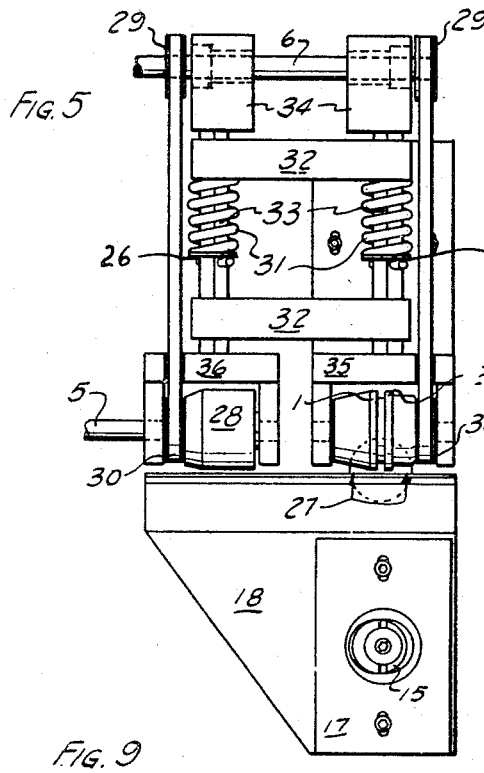
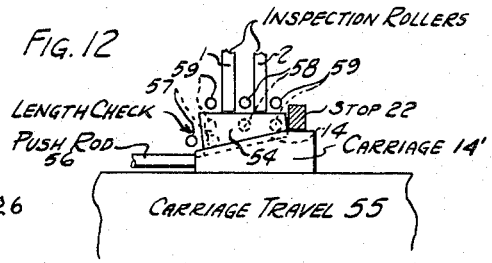
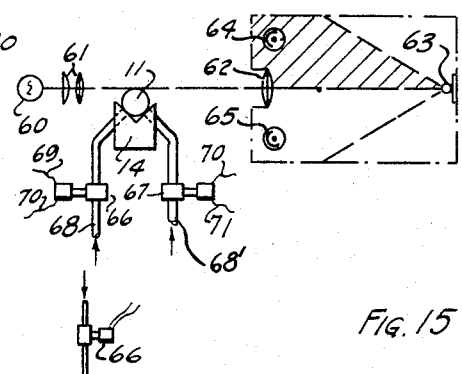
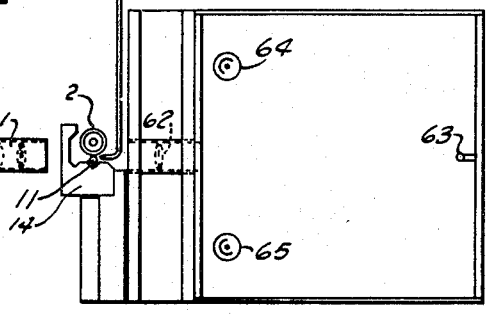
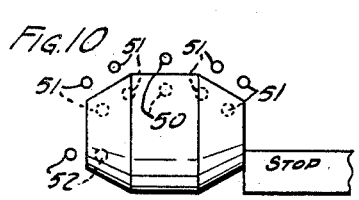
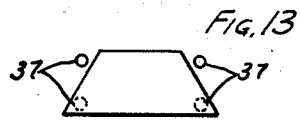
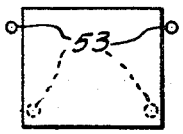
INVENTOR.
SAMUEL C. HURLEY JR.
BY Benedict & Swartwood
ATTORNEYS

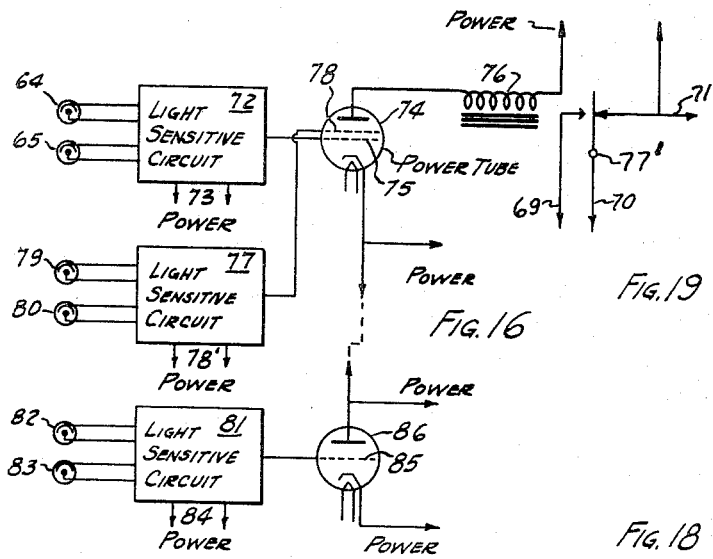

Patented Feb. 4, 1947

2,415,176

UNITED STATES PATENT OFFICE 2,415,176

PHOTOELECTRIC APPARATUS FOR SCANNING ROUNDS

Samuel C. Hurley, Jr., Danville, Ill.

Application July 17, 1944, Serial No. 545,360

4 Claims. (Cl. 88—14)

My invention relates broadly to a device for the scanning of rounds by rotating the round in a photoelectric inspection zone. The amount of rotation depends on the type of inspection desired and may vary from a number of complete revolutions of the round to just a fraction of a revolution of the round during the time the round is in the inspection zone.

One object of my invention is photoelectrically scanning a round at a given point within rather narrow limits. This may be accomplished by spinning the round against a stop or block; and by suitable arrangement of a light beam and light sensitive devices, the entire circumference of the round is scanned within comparatively narrow limits.

It is also an object of my invention to spin or rotate the round such that the axis of rotation is substantially transverse to the axis of the light beam passing through the inspection zone.

Another object of my invention is to photoelectrically scan a round by spinning or rotating it past an inspection point or through an inspection zone in a photoelectric inspection device, whereby the entire circumference of a round throughout its entire length is scanned.

Therefore my photoelectric scanning device may broadly be divided into general but not exactly equivalent classes:

1. Spinning and moving a round through an inspection zone.
2. Spinning a round against a stop.

Further broad objects of my invention are to make one or more of the following kinds of inspection of a round either independently or simultaneously in the same inspection step, or two or more inspections in a step-wise manner in separate but cooperative inspection operations:

1. For a predetermined dimension.
2. To determine a dimension.
3. To inspect or determine its shape.

Illustrative of some of the specific inspections for indicating, determining or measuring for a round are the following:

1. Diameter.
2. Length.
3. Bevel.
4. Curvature.
5. Alignment.
6. Parallelism.
7. Internal round surfaces for eccentricity and concentricity.
8. External surfaces of rounds for eccentricity and concentricity.

9. Irregularities in surface such as flat spots, depressions, ridges, etc.
10. To determine the location, shape and size of different parts or segments such as slots, grooves, scratches, threads.
11. To determine whether a piece is true, e. g., whether the end of a cylinder is at right angles with the longitudinal dimension.
12. Angle.
13. Major diameter, pitch diameter, angle, lead, etc., of threads.

By a round, I mean any object which has any bearing surface which is round and by way of example the following are given to indicate the various kinds of round that may be inspected by my device.

1. Pins.
2. Tubes.
3. Rivets.
4. Tops.
5. Bullet shaped.
6. Spools.
7. Hour glass shapes.
8. Cones.
9. Ellipsoids.
10. Truncated cylinders and cones.
11. Barrel shaped.
12. Paraboloids.
13. Cylinders.
14. Spheres.
15. Screws.
16. Threads.
17. Bolts.

The previous photoelectric inspection methods for determining shapes and dimensions, etc., of a round do not involve scanning the round by rotating it at an inspection point and therefore inaccuracies in the inspection are unavoidable. By my device, the entire circumference of a round may be inspected and therefore I have provided an improved, accurate and speedy device for inspection of rounds.

A further object of my invention is to provide a novel apparatus for spinning the rounds in an inspection zone and a novel device for maintaining only one round at a time in the inspection zone as well as a novel apparatus for removing the round inspected and placing the next round in inspection position.

A broad embodiment of my invention comprises means for projecting a beam of light through an inspection zone, means for rotating a round in the inspection zone to scan the round, means for interrupting a portion of the beam by said round in the inspection zone and a light sensitive device responsive to the portion of the light beam passing through the inspection zone.

One of my more specific embodiments comprises a device for rotating a round in and through an inspection zone whereby the round is scanned throughout its length, an optical system including a light source, a light sensitive circuit responsive to that portion of the beam of light from the light source which passes through the inspection zone when the round is in the inspection zone, and means for interpreting the response in the light sensitive circuit.

A further embodiment of my invention comprises means for continuously feeding rounds to an inspection zone, means for maintaining only one round at a time in the inspection zone and for feeding the next round to be inspected into the inspection zone and means for rotating the round while it is in the inspection zone.

In another embodiment, two or more inspections are made simultaneously by spinning the round in an inspection zone in front of a beam of light such that the portion of the beam passing through the inspection zone actuates two independent light sensitive devices, each responsive to one of the inspections that are desired and then interpreting the response of the light sensitive devices in accordance with the overall inspection desired.

Other embodiments, advantages, objects, uses and applications of my invention will become apparent by referring to the drawings which are only illustrative of devices of accomplishing the objects of my invention but are not to limit the scope of my invention and in which:

Fig. 1 illustrates schematically in elevation a device for spinning a round in order to scan it in the inspection zone.

Fig. 2 illustrates schematically the arrangement of a number of light sensitive devices to indicate the various inspections desired.

Fig. 3 is a more detailed elevation of Fig. 1.

Fig. 4 is a plan view of Fig. 1.

Fig. 5 is another apparatus for rotating the round in the inspection position and particularly for rotating it and passing it through the inspection zone.

Fig. 6 illustrates diagrammatically one inspection using the apparatus shown in Figure 5.

Figs. 7 and 8 indicate two specific applications of the apparatus shown in Fig. 5.

Figs. 9 to 13 illustrate a few of the types of inspections that may be made by my device.

Fig. 14 shows a typical optical setup with means including solenoid valves connected to a suitable source of high pressure gas supply for placing rounds in the proper place at the end of the inspection.

Fig. 15 shows another optical setup and means for transferring a round from one inspection device to another.

Fig. 16 shows schematically a number of electronic circuits which may be used in my device.

Figs. 17, 18 and 19 show another optical setup for making a number of inspections within the scope of my invention.

Figs. 20, 21 and 22 show another optical system for determining other inspections.

Figure 1 shows an elevation partly schematic of one apparatus for spinning or rotating the rounds in an inspection zone. It also shows a novel device for continuously feeding the rounds to the inspection zone, as well as means for maintaining only one round in the inspection zone at one time, as well as a novel device for simultaneously removing the round just inspected and feeding another round to be inspected into the inspection zone. In addition, it shows the means for adjusting the apparatus in order to accommodate different sized rounds. While I have shown the rounds in position to be rotated by inspection rollers mounted directly above the rounds with the rounds being rotated in the block for inspection, rollers may be mounted underneath the rounds and they themselves form a V block for feeding and rotating the rounds into and through the inspection zone. In this case, either idler rollers or other bearing surfaces may be mounted above the rounds in inspection position in order to hold them in place. Also, while I have shown the apparatus in horizontal position it may be tilted downwardly in the direction the rounds are fed to the inspection zone in order to feed the rounds at least partially by gravity.

In Figure 1, I have illustrated rounds in inspection position which are shaped like an hour glass, although the apparatus may be used for any shaped round within the scope of my invention. The inspection rollers 1 and 2 mounted on or attached to the enlarged part 3 of sleeve 4 are rotated by means of driving shaft 5. Sleeve bearing 4' is pivotally mounted at 6 with the other end 7 of the shaft located in opening 8 of end plate 9. Feed tube 10 or any other suitable feeding means feeds the round into inspection position wherein the round first contacts roller 1. I have shown the roller angled in respect to the axis of shaft 5 in order to keep the round being inspected away from the next round to be inspected. The angle of the rollers in this drawing is exaggerated in order to illustrate more clearly the principle. In a round shaped like an hour glass, it is not usually necessary to angle the rollers in the manner shown in order to keep only one round at a time in the inspection zone, since there is a bevel on the hour glass type of round which, with a straight roller, will accomplish the same result.

In this drawing, the round being rotated and in inspection position is 11, whereas the next round to be inspected is indicated as 12. Other rounds contained in the feed tube are indicated by 13. The rounds are supported by a V block 14, although other means for supporting the rounds while being rotated may be used within the scope of my invention. The adjusting cam 15 mounted in the opening 16 (see Fig. 3) in plate 17 is arranged and adapted to actuate the plate 18. The plate 18 is slidably attached to the plate 17, the plate 17 being fixed when the cam 15 is turned in the opening 16 of the plate 17. The cam 15 attached to plate 18 raises and lowers the plate 18 and the plate 18 in turn raises and lowers the V-block 14 since the V-block 14 is attached to the plate 18. The V block 14 by being attached to plate 18 may thereby be raised and lowered in order to adjust the distance between the rollers and the V block to accommodate different sized rounds. The cam 19 is located on the end of sleeve 4 and is shown in the position that it occupies while the round is being rotated in the inspection zone. As the sleeve 4 turns, the cam bears on the bearing surface 20 mounted in the frame 21 in such a manner that at the end of inspection, the cam 19 raises the rollers 1 and 2 and by suitable means, depending upon the type of inspection desired, the round 11 is removed from the inspection zone at the same time the round 12 is introduced into the inspection zone. The round 11 may be removed by suitable air jets or other means at the end of the inspection. The next round 12 in the inspection zone when the rollers 1 and 2 are raised by the cam 19 may be fed against the stop 22 attached to the plate 23' by means of feeding mechanism or means attached to tube 10 or the entire apparatus shown in Figure 1 may be inclined in a downward direction from the left end of shaft 5 to the cam 19 and the next round 12 to be inspected will slide into inspection position against the stop 22 by means of gravity. Thus, the cam 19 is operated in such a manner as to provide a means for permitting the round in the inspection zone to be removed from the inspection zone, or a portion of the roller 2 may be cut or flattened in such a manner (not illustrated) that when the flattened part reaches the round, the inspection is ended and a blast of air removes the round from the inspection zone and then in sequence the cam 19 raises the roller unit and permits the next round 12 to enter the inspection zone.

Throughout the description of the various drawings the same numerals will be used for the same parts wherever possible in order to make the drawings and illustrations easier to follow.

Figure 2 illustrates schematically the relative location of phototubes 23, 24, and 25 for indicating or inspecting different dimensions or for making different inspections. Throughout the description of the drawings, those tubes in shadow when the piece is of the proper size or shape are indicated by dotted lines and those in light when the piece is proper are indicated by solid lines.

In Figure 2, tubes 24, one in shadow and one in light, indicate or measure the diameter of one end of the hourglass round 11. One of the big advantages of my apparatus over those shown in the prior art is that by rotating the round, not only may the dimension be measured but irregularities or unwanted shapes of the rounds indicated above may be determined and the piece rejected or returned to the manufacturing step to be adjusted.

In a similar manner, phototubes 23 measure the diameter and the imperfections at the other end of the V block. Tubes 25 may be used to indicate the overall length of the round and at the same time, by properly placing the tubes 25, along the outer edge of the round the tubes 25 may be used to indicate undue and undesired bevel of the end surface of the round as well as any ridges or depressions outside of the tolerance range. Although I have shown only three specific inspections for the hour glass round in Fig. 2, any others may be made that are desired within the scope of my invention.

Figure 3 shows a somewhat more detailed elevation of the apparatus than is shown in Figure 1. The same numbers on Fig. 3 for indicating the various parts are used as those indicated on Figure 1. Figure 4 shows a detailed plan view of the apparatus used in Figure 1.

The tension on the rounds in the apparatus shown in Figure 1 in order to provide sufficient friction to properly rotate the rounds is provided entirely by the weight of the sleeve 4, although other means for maintaining such tension may be used; one other method is shown in Figure 5, as will be described later.

Figure 5 is a front elevation to illustrate another means for feeding rounds to be inspected and for rotating them in the inspection zone. A shaft 5 is attached to the feed roller 28. Inspection rollers 1 and 2 are not attached to the shaft 5 but the feed roller 28 and inspection rollers 1 and 2 are driven independently by the driving shaft 6 to which are attached pulleys 29. By proper arrangement of the ratio of the pulleys 29, attached to the shaft 6, to the pulleys 30 attached to shaft 5 and the shaft on which rollers 1 and 2 are mounted, inspection rollers 1 and 2 may be rotated at a different rate than the roller 28, and thus the rate of spinning of the round in the inspection zone 27 may be controlled independently of the rate of feeding of the rounds to the inspection zone.

The adjusting cam 15 in Figure 5 may be used for the same purpose as the cam 15 indicated on Figure 1. In Figure 5, a method for providing a proper tension on the rounds being rotated by the rollers is by the use of tension springs 31 mounted in tension position between the upper plate 32 and the pins 26. The lower ends of the springs are attached to the said pins 26. Shafts 33 are slidably positioned in plates 32 both the upper and lower plates serving as guides. Thus, the tension in the springs reacts against blocks 35 and 36, which press the rollers down upon the rounds being fed to and being rotated in inspection zone 27.

The one fundamental difference between Figures 5 and 1 is that in Figure 1 the round is rotated against a stop, thus, the circumference of the round at a given point within rather narrow limits or the end of the round may be scanned; but in Figure 1, the entire surface of the round cannot be scanned. Figure 1, is particularly useful in connection with pieces that are too small to be properly fed continuously through the inspection zone while being rotated and therefore the piece must be rotated against a stop. However, where feasible or desirable, the apparatus illustrated in Figure 5 may be used and provides a means for continuously rotating a round through an inspection zone. The inspection rollers 1 and 2 of Figure 5 may be adapted similarly to those shown in Figure 1 to maintain one round at a time in the inspection zone. As a round leaves inspection roller 2, it may be removed from the inspection zone by conventional means not shown in Figure 5, but illustrated in Figure 14. Of course, the apparatus illustrated by Figure 5 may be provided with camming devices such as 19 shown in Figure 1 in order to provide means for removing the inspected piece from the inspection zone; but, in general, the apparatus illustrated in Figure 5 is for continuously rotating a round through the inspection zone, whereas Figure 1 illustrates the method for rotating the round in the inspection zone against a stop.

In Figure 5, the rounds may be fed into the inspection zone or fed to the feed roller 28 by means of a device similar to the feeding tube 10 illustrated in Figure 1. The rollers indicated in Figure 5 may be adjusted and adapted to feed the rounds continuously through the apparatus or the entire apparatus may be inclined in a left to right direction in order to feed the rounds through the apparatus by means of gravity. The blocks 34 are attached to the plate 32 and within the blocks 34 I provide a bearing means in which the shaft 6 rotates.

Figure 6 shows a diagrammatic illustration of the apparatus shown in Figure 5 to indicate one use of the apparatus in Figure 5 wherein the round to be inspected is maintained in inspection position and the round about to be inspected is maintained outside of the inspection zone. The inspection points are indicated by X's.

Figure 7 illustrates diagrammatically the arrangement of phototubes for indicating or measuring the diameter of the round as it is continuously passed or rotated through the inspection zone, tubes 38 being used for this purpose, one tube being in shadow and one tube being in light when the piece is proper. Phototubes 39, 40, 41 and 42 are used for photoelectrically camming the length of the round in order to determine or indicate its length. When the tubes 39 and 42 are in shadow and 40 and 41 remain in light during the entire rotation operation, the round is of the proper length. Tubes 39 to 42, inclusive, in Figure 7 may be also used to determine whether the right section of the round, shown as a cylinder, is perfect or may be used to determine the angle between the end face of the round and its axis.

Figure 8 shows a device for photoelectrically camming both the diameter and the length of the cylindrical round simultaneously. Tubes 43 indicate the diameter, whereas tubes 44 indicate the length. In this type of inspection, the V block 14 is cut away as indicated at point 45 in order to obtain the desired inspection.

Figures 9 to 13, inclusive, are diagrammatic or schematic drawings to show the various types of inspections that may be made by my apparatus, although it is apparent that many other types not illustrated may be readily and accurately made within the scope of my invention. Fig. 9 shows an hour glass shape with which light sensitive devices such as photoelectric tubes 46, 47, and 48 may be used to indicate or measure or determine the diameter of the hour glass at different points, whereas tubes 49 are used to indicate the length of the hour glass by photoelectric scanning.

Figure 10 illustrates another shape of round and a number of inspections that may be made on this shape of round, although many others are possible. Phototubes 51 may be used to indicate the angle or bevel of this type of round by photoelectric scanning. Phototubes 52 may be used to indicate the length of this type of round and phototubes 50 the diameter at one point. In this operation, the round is rotated against a stop.

Figure 11 illustrates a device for determining whether the right angle or the right section of a cylinder is proper by interpreting the state of illumination of tubes 53. When two phototubes are in shadow and two phototubes are in light throughout the entire spinning of the round in the inspection zone, the right angle of the cylinder is right. This same arrangement can also be used to indicate any bevel on the ends of the cylinder. At the same time, this method may be used to indicate any rough spots or depressions or other irregularities in the end surfaces of the round.

Figure 12 illustrates a device for inspecting a tapered piece such as the section of a cone 54 shown in test position and being rotated by means of rollers 1 and 2 against a stop block 22. The tapered piece is rotated in a V block 14 located in the carriage 14' which may be moved along the carriage travel 55 by means of the push rod 56 into the inspection position. Phototubes 57 may be used to indicate or measure the overall length of the tapered piece. Tubes 58 may be used to indicate or measure the diameter of the piece at one point. Tubes 59 may be used both to measure and indicate the diameter at two different points on the tapered round and also may be used to indicate whether the bevel or taper of the piece is proper. Of course, it is apparent that other inspections of the beveled round may be made within the scope of my invention by properly locating additional photoelectric tubes cooperatively arranged with a suitable optical system including a light source.

Figure 13 illustrates a device for determining the proper bevel of a round of this type by means of photoelectric scanning and the proper placing of tubes 37.

Figure 14 illustrates one type of an optical system which may be used in connection with any one or more of the various inspections made by my invention. In Figure 14, the round 11 is shown in inspection position wherein it is rotated in the V block 14. A suitable light source 60 which is illustrated as an incandescent lamp, can be used to project a beam of light through the inspection zone by means of condensing lenses 61, and the projecting lens 62 projects an image of a portion of the round 11 onto the center point of magnifying mirror 63 shown in the illustration as a convex mirror; however, the convex mirror may be spherical or cylindrical or a plano-convex mirror may be used such as a spherical or cylindrical section. In some cases, depending upon the inspection desired and the kind of mirror used, the focal point of projection lens 62 may be at a point somewhat beyond the magnifying mirror but on the optical axis of the lenses 61 and 62 and the light source 60.

Suitable light sensitive devices shown in Figure 14 as photoelectric tubes may be arranged such as to receive the magnified image reflected from the magnifying mirror 63. In the illustration shown, it is desired only to measure or determine the diameter of the round 11 while it is rotated in the inspection zone. In this case, the phototube 64 is in shadow and tube 65 is in light when the round is of the proper diameter. If both tubes are in light or both are in shadow, the diameter is not of a predetermined size. The tubes 64 and 65 may be connected in a suitable light sensitive circuit, partly illustrated in Figure 16, in order to determine the state of illumination thereof and by use of the proper circuit, the photoelectric inspection of the round 11 may be interpreted.

Still referring to Figure 14, suitable valves such as solenoid valves 66 and 67 may be used for sorting. In the case where several inspections are to be made, valve 66 is positioned in a high pressure gas line 68 and may be used to discharge the round into another feeding mechanism wherein it is passed to a second inspection operation and valve 67 in line 68' is used to reject or discharge the round 11 in another direction if the round does not meet the proper specification required as measured by the first inspection operation. More specifically, I have illustrated a means for accepting or rejecting the round in one inspection, in which case valve 66 in high pressure gas line 68 is used for accepting the round. Valve 66 is connected by leads 69 and 70 to a suitable source of power and valve 67 is connected by leads 70 and 71 to a suitable source of power. The valves may be controlled by a light sensitive circuit as will be illustrated and further described in Figure 16. In Figure 14, if the piece is proper, tube 64 is in shadow and 65 is in light and if connected in a suitable circuit will control and operate valve 66 and the piece will be accepted or passed along to another inspection operation. If both tubes 64 and 65 are either in light or in shadow, the piece is improper and the valve 67 will be actuated thereby rejecting the piece.

Figure 15 is similar to Figure 14 but illustrating more specifically a means for passing a round from one inspection operation to another. If the round meets the requirements determined by one inspection operation, the solenoid valve 66 is actuated which moves the round from one inspection position to another. Of course, this same means may be used for accepting the piece or placing it in any desired receptacle.

Figure 16 illustrates diagrammatically an arrangement of an electronic circuit including a light sensitive circuit to which is connected one or more light sensitive devices. It also shows the control by the electronic circuit of an energy translating means which may interpret the results of the inspection or may actuate a control circuit which controls or indicates or interprets the results of the inspection.

Referring to Figure 16, an electronic circuit is illustrated which may be used in connection with, for example, the device illustrated in Figure 5 and the optical system shown in Figure 14. The tubes 64 and 65 in Figure 14 are connected to a light sensitive circuit 72 which is connected to the source of power 73. An electronic tube 74 which may be either a gaseous or a vacuum type tube, but preferably of the gaseous type in order to supply suitable amplification, has its control grid 75 connected to the light sensitive circuit. The bias on the power tube 74 may be normally maintained either negative or positive and the light sensitive circuit may be used to change the bias from its normal condition, dependent upon the type of operation and inspection desired. In one specific operation, taken merely as illustrative of one method of carrying out my invention, tubes 64 and 65 of Figure 16 correspond to those in Figure 14 wherein the diameter of the round 11 may be indicated or the round may be tested for a predetermined diameter. In this case, the bias of the tube 74 is normally maintained negative which prevents the tube from ionizing. When the tube 64 is in darkness and tube 65 is in light, the light sensitive circuit comprising the tubes 64 and 65 in a bridge or other suitable arrangement will place a high positive potential on the control grid 75 of tube 74 which will overcome the normal negative bias of the tube and will cause current to flow in the plate circuit of tube 74. When such current does flow, the energy translating means shown as a relay coil 76 will be energized.

When the relay coil 76 is energized, it will actuate the relay switch 77'. In a specific example in Figure 16, the relay switch is normally in position to close the circuit between points 70 and 71 and referring to Figure 14, the relay switch in this position actuates the solenoid valve 67 and the round 11 is rejected and sent to the reject receptacle. When the energizing coil 76 is actuated, it pulls the relay switch over, connecting leads 69 and 70 and again referring to Figure 14, the solenoid valve 66 is actuated which passes the round to the accept receptacle or to the next inspection operation or to any other desired place. Thus, by the use of the apparatus shown in Figures 5 and 14, and what I have thus far described in relation to Figure 16, a means is provided for accepting or rejecting a round in accordance with a predetermined dimensional characteristic.

While I have shown in Figure 16 a method of actuating a relay switch as the interpreting means, an indicating device of any kind may be placed directly in the anode circuit of the tube 74 such as a bell, meter, flag, etc., for indicating the dimension or shape of the article being tested, or such indicating device may actuate the relay or control system of which the relay switch is a part. In other words, the particular means for interpreting the results of the inspection is not novel in my apparatus and any of the conventional means may be used.

Referring further to Figure 16, a second light sensitive circuit 77, to which may be connected one or more light sensitive devices 79 and 80, may be connected to a source of suitable power 78'. The screen grid 78 of the power tube 74 may be controlled by the second light sensitive circuit thus providing a means for independently controlling the bias on the power tube 74, but both grids 75 and 78 must be driven in the same direction of potential to accomplish the result desired. In other words, if the bias on the tube 74 is ordinarily negative, the light sensitive circuits 72 and 77 will have to simultaneously place a positive bias on the control grid 74 when a predetermined inspection occurs. It will be apparent that any number of combinations for using light sensitive circuits 72 and 77 are possible within the limits of my invention.

One application might be used to measure the length of the round while it is rotated in the inspection position. In this case, phototubes 64 and 65, 79 and 80 correspond to tubes 42, 41, 39, and 40, respectively, of Figure 7. Thus, the length of the round in Figure 7 may be photoelectrically cammed in my device by using the circuit thus far described in Figure 16. This same circuit may be used for indicating when a round simultaneously meets a predetermined dimension at two different points. In this case, the tubes 64, 65, 79 and 80 of Figure 16 may correspond to the tubes 50 and 52 of Figure 10, and thus, unless the piece corresponds to the proper length as indicated by tubes 52, and is of the proper diameter as indicated by tubes 50 in Figure 10, the energizing means 76 of Figure 16 will not be actuated and the round will be rejected.

Similarly, a third light sensitive circuit 81 to which are attached light sensitive tubes 82 and 83 can also be employed in the electronic circuit, depending upon the type of inspection desired. In one application the light sensitive circuit 81 may be connected to the control grid 85 of a gas-filled tube 86 for controlling the ionization of that tube. In this case, tubes 86 and 74 are connected in series across the power lines and both of the tubes must ionize in order for the energizing means 76 to be energized. The complete circuit illustrated in Figure 16 may therefore be used to determine one dimension by photoelectric camming and, at the same time, determine another dimension; or the three light sensitive circuits 72, 77, and 81 may be used to make three separate inspections such as shapes, etc. Furthermore, any one of the light sensitive circuits may be used in combination with the others as shown, or may be used independently as the case may be, depending upon the type of inspection desired. The illustration of Figure 16 is merely illustrative of an electronic circuit which can be used to carry out my invention, although any other suitable method and apparatus may be used.

Referring to Figure 17, an illustration is given of the plan view of an optical system and its relationship to the rotation of a round in the inspection zone which can be used for determining more than one dimension or shape or irregularity simultaneously. The light source 60, the condensing lens 61 and the projection lens 62 are arranged in a manner previously discussed when carrying out similar inspections. The round 11 is shown in the V block 14 and is rotated in the inspection zone by means of roller 1. The beam of light passing through the projection lens 62 is cast upon magnifying mirrors 86, 86' and 87. Since at least three mirrors are used in this type of structure, the focal point of the projection lens is on the optical axis of the lenses 61 and 62 in order that the entire image of the piece may be placed upon the mirrors 86, 86' and 87. These mirrors may be of any suitable type, as previously discussed. In this case, the mirror 87 is used for determining the length of the round 11 and the image is reflected from this mirror onto two phototubes 88 and 89, only tube 88 being shown in Figure 17, since the other phototube 89 is behind tube 88 as shown in Figure 19. In this particular case, the round is rotated against the stop; therefore, only two phototubes, 88 and 89, are needed to measure or indicate the length of the round. If the stop is located in the position shown in Figure 1, tube 88 will be in light and tube 89 will be in shadow when the round is of the proper length. By properly connecting the two tubes in a suitable electronic circuit such as that shown in Figure 16, the length may be indicated and the results properly interpreted.

The magnifying mirrors 86 and 86' are used in connection with indicating the diameter of the round at two different points. When tubes 90 to 93 are in shadow, the piece meets the requirements of two predetermined diameters. Any other condition does not meet the requirements and the round is rejected. The tubes 90 to 93 are provided with screens 94 and 95 to block off each pair of the tubes in order to independently indicate each dimension and to place each pair of phototubes in a predetermined state of illumination when a standard article is in the inspection zone.

Figure 18 is a view along the line 18—18 of Figure 17 showing the arrangement of the mirrors.

Figures 20, 21 and 22 illustrate another arrangement of magnifying mirrors and photoelectric tubes for accomplishing other desired inspections. For example mirrors 103 and 104, in conjunction with phototubes 96, 97, 98, and 99, may be used to determine or indicate two different inspections or specifically may be used for photoelectric camming of the length of a round. A magnifying mirror 100, together with photoelectric tubes 101 and 102 may be used for another inspection such as determining the diameter by scanning.

I claim as my invention:

1. Apparatus for inspecting an article, comprising means defining an inspection zone, means for projecting a beam of light through said inspection zone, means for rotating an article in said zone about an axis of rotation coinciding with the longitudinal axis of the article, two photoelectric devices arranged to receive light from said beam passing through the inspection zone, said devices being positioned adjacent, and on opposite sides of, a portion of the outline of a shadow resulting from the interception of a part of said light beam due to the presence of a standard article in the inspection zone, whereby one device is in light and the other in shadow when a standard article is in the inspection zone, said devices being connected in a circuit so that the flow of current in said circuit is changed when said light and shadow conditions change as a result of a different interruption of the light beam due to the presence in the inspection zone of an article which does not conform to the standard, said circuit comprising an electronic tube having an anode circuit, a cathode circuit and a control grid, said grid being electrically connected in the circuit including the photoelectric devices so as to be controlled in accordance with changes in light and shadow conditions of the photoelectric devices.

2. Apparatus for inspecting an article, comprising an indicating means, means defining an inspection zone, means for projecting a beam of light through said inspection zone, means for rotating an article in said zone about an axis of rotation coinciding with the longitudinal axis of the article, two photoelectric devices arranged to receive light from said beam passing through the inspection zone, said devices being positioned adjacent and on opposite sides of, a portion of the outline of a shadow resulting from the interception of a part of said light beam due to the presence of a standard article in the inspection zone, whereby one device is in light and the other in shadow when a standard article is in the inspection zone, said devices being connected in a circuit comprising amplifying means including an electronic tube having an anode circuit, a cathode circuit and a control grid, said grid being connected in said circuit for controlling the change in flow of current through said circuit in accordance with changes in light and shadow conditions of the photoelectric devices resulting from a different interception of the light beam due to the presence in the inspection zone of an article which does not conform to the standard, and means in said anode-cathode circuit for controlling said indicating means in response to change in the flow of current in said circuit for indicating the state of illumination of the photoelectric devices.

3. Apparatus for inspecting an article comprising means defining an inspection zone, means for projecting a beam of light through said inspection zone, means for rotating an article in said zone about an axis of rotation coinciding with the longitudinal axis of the article and extending in a direction substantially transverse to the light beam, two photoelectric devices arranged to receive light from said beam passing through the inspection zone, said devices being positioned adjacent, and on opposite sides of, a portion of the outline of a shadow resulting from the interception of a part of said light beam due to the presence of a standard article in the inspection zone, whereby one device is in light and the other in shadow when a standard article is in the inspection zone, said devices being connected in a circuit so that the flow of current in said circuit is changed when said light and shadow conditions change as a result of a different interception of the light beam due to the presence in the inspection zone of an article which does not conform to the standard, said circuit comprising an electronic tube having an anode circuit, a cathode circuit and a control grid, said grid being connected in the circuit including the photoelectric devices so as to be controlled in accordance with changes in light and shadow conditions of the photoelectric devices.

4. Apparatus for inspecting an article comprising means defining an inspection zone, means for projecting a beam of light through said inspection zone, means for rotating an article in said zone about an axis of rotation coinciding with the longitudinal axis of the article and extending in a direction substantially transverse to the light beam, and for moving the article along its axis of rotation to inspect different parts thereof, two photoelectric devices arranged to receive light from said beam passing through the inspection zone, said devices being positioned adjacent, and on opposite sides of, a portion of the outline of a shadow resulting from the interception of a part of said light beam due to the presence of a standard article in the inspection zone, whereby one device is in light and the other in shadow when a standard article is in the inspection zone, said devices being connected in a circuit so that the flow of current in said circuit is changed when said light and shadow conditions change as a result of a different interception of the light beam due to the presence in the inspection zone of an article which does not conform to the standard, said circuit comprising an electronic tube having an anode circuit, a cathode circuit and a control grid, said grid being connected to the circuit including the photoelectric devices so as to be controlled in accordance with changes in light and shadow conditions of the photoelectric devices.

SAMUEL C. HURLEY, Jr.

REFERENCES CITED

The following references are of record in the file of this patent:

UNITED STATES PATENTS

| Number | Name | Date |
|---|---|---|
| 1,640,567 | Firestone | Aug. 30, 1927 |
| 2,085,671 | Powers | June 29, 1937 |
| 2,290,606 | Burnett | July 21, 1942 |
| 1,940,882 | Rich | Dec. 26, 1933 |
| 2,318,856 | Hoffman | May 11, 1943 |
| 2,355,092 | Meister | Aug. 8, 1944 |